Feb. 4, 1964 R. W. BURNETTE 3,120,032
EMERGENCY ESCAPE
Filed Jan. 12, 1961 6 Sheets-Sheet 1

INVENTOR.
Robert W. Burnette
BY
Attorneys

Feb. 4, 1964  R. W. BURNETTE  3,120,032
EMERGENCY ESCAPE
Filed Jan. 12, 1961  6 Sheets-Sheet 2

INVENTOR.
Robert W. Burnette
BY
Attorneys

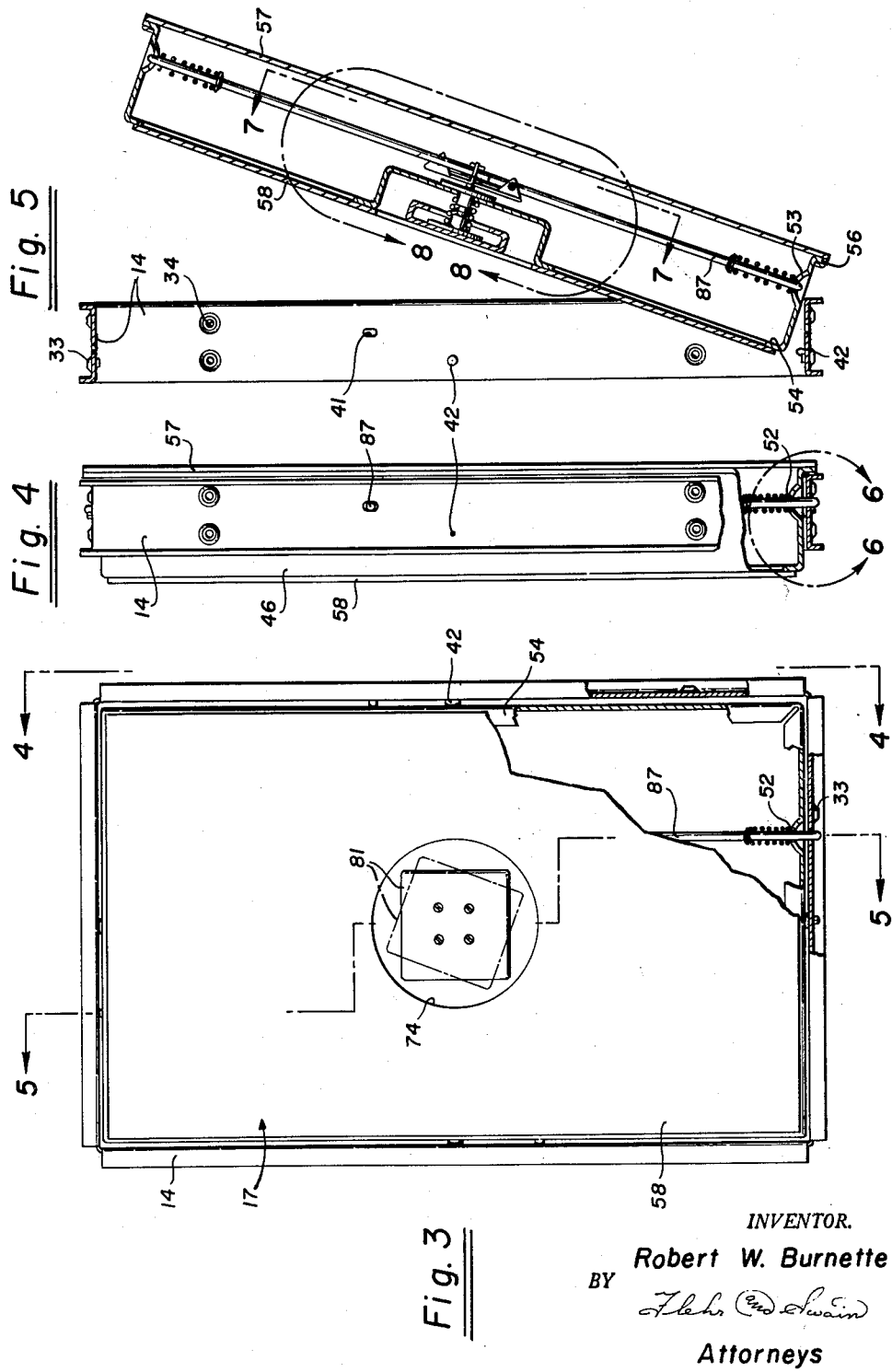

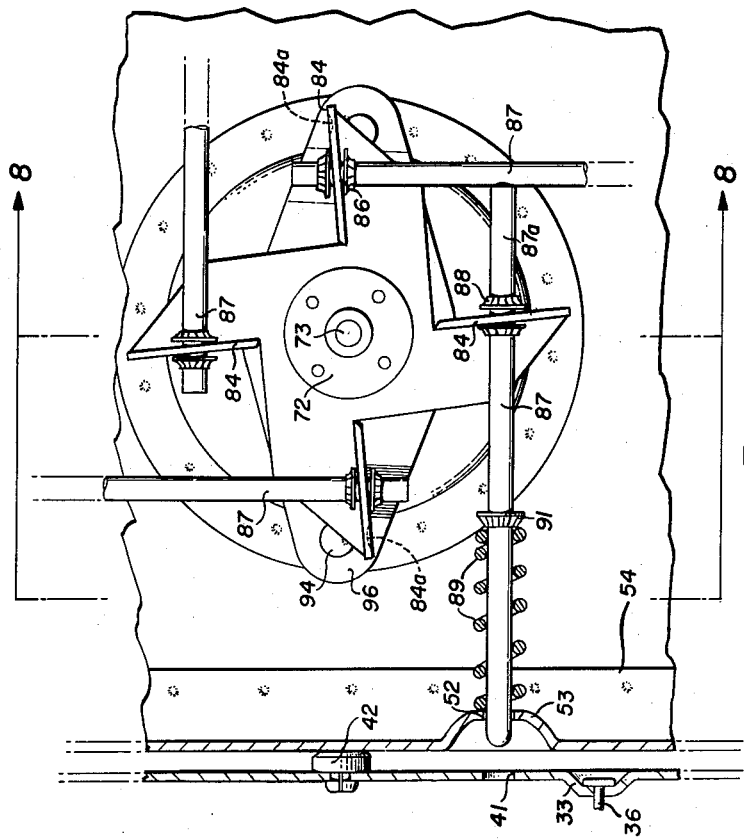
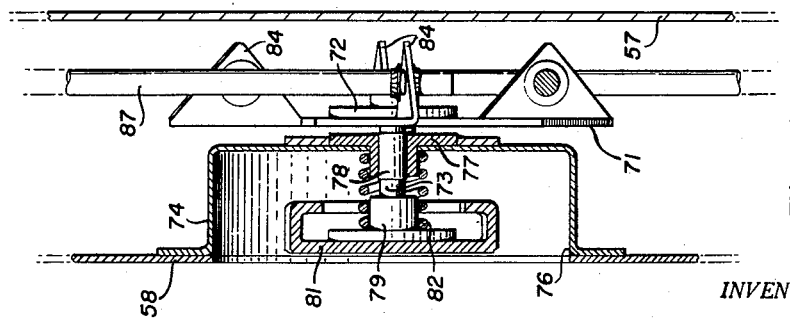
INVENTOR.
Robert W. Burnette

Feb. 4, 1964  R. W. BURNETTE  3,120,032
EMERGENCY ESCAPE
Filed Jan. 12, 1961  6 Sheets-Sheet 5
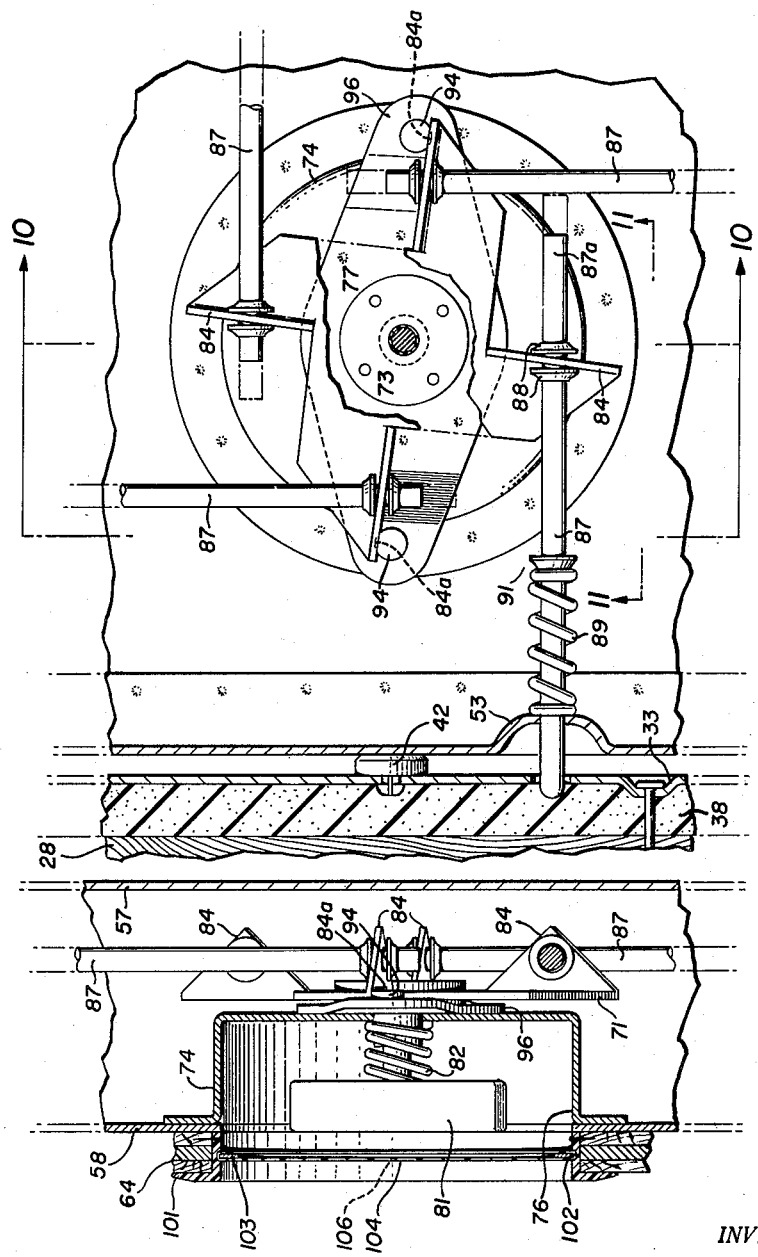
INVENTOR.
Robert W. Burnette
BY
Attorneys Feb. 4, 1964 R. W. BURNETTE 3,120,032
EMERGENCY ESCAPE
Filed Jan. 12, 1961 6 Sheets-Sheet 6

INVENTOR.
Robert W. Burnette
BY
Attorneys

United States Patent Office 3,120,032
Patented Feb. 4, 1964

3,120,032
EMERGENCY ESCAPE
Robert W. Burnette, 3603 Bryant St., Palo Alto, Calif.
Filed Jan. 12, 1961, Ser. No. 82,282
14 Claims. (Cl. 20—16)

This invention relates to an emergency escape and more particularly to an emergency escape suitable for use in homes, apartments and industrial type buildings.

Increasing attention is being given by fire departments, fire marshals and the like in providing in homes, apartments and industrial buildings means which will permit an emergency escape from the building in the event of fire or other catastrophe. In many buildings, it is possible for fire or other types of catastrophe to block off the main routes of exit, and for that reason it is necessary to provide other means for emergency escape. Emergency escapes heretofore on the market have often been unsatisfactory for a number of reasons such as high cost, difficulty of installation, and so forth. In particular, there has been no emergency escape device particularly adaptable for use in homes which is relatively inexpensive. There is, therefore, a need for a new and improved emergency escape.

In general, it is an object of the present invention to provide an emergency escape which can be readily operated in the case of emergency to provide an emergency exit.

Another object of the invention is to provide an emergency escape of the above character which is particularly adaptable for providing a ground level emergency exit for residential dwellings.

Another object of the invention is to provide an emergency escape of the above character which is also particularly adaptable for use in commercial and industrial buildings.

Another object of the invention is to provide an emergency escape of the above character which can be incorporated in new construction or as a modification to existing construction.

Another object of the invention is to provide an emergency escape of the above character which can be mounted within the standard 16-inch center-to-center stud spacing provided in the conventional wood frame residential dwellings.

Another object of the invention is to provide an emergency exit of the above character which presents a flush surface to the interior and to the exterior of the building.

Another object of the invention is to provide an emergency escape of the above character which utilizes particularly novel operating means.

Another object of the invention is to provide an emergency escape of the above character in which visual inspection can be utilized to determine whether or not the operating means for the escape has been released.

Another object of the invention is to provide an emergency escape of the above character which can be readily operated by children.

Another object of the invention is to provide an emergency escape of the above character which can be utilized by persons with infirmities that render escape over high window sills dangerous and improbable.

Another object of the invention is to provide an emergency escape of the above character in which wall coverings can be secured to the emergency escape so that the escape blends with the exterior and interior walls.

Another object of the invention is to provide an emergency escape of the above character which has good insulating qualities.

Another object of the invention is to provide an emergency escape of the above character which is fail-safe.

Another object of the invention is to provide an emergency escape of the above character which will require no servicing, adjustment, or lubrication of the mechanism during the life of the device.

Another object of the invention is to provide an emergency escape of the above character in which the operating means is recessed but is still readily accessible for operation.

Additional objects and features of the invention will appear from the following description in which the preferred embodiments have been set forth in detail in conjunction with the accompanying drawings.

Referring to the drawings:

FIGURE 3 is a front elevational view of the interior side of the emergency escape with certain portions broken away.

FIGURE 4 is a side elevational view looking along line 4—4 of FIGURE 3.

FIGURE 5 is a side elevational view in cross-section looking along the line 5—5 of FIGURE 3 with the closure dropping out of the frame.

FIGURE 7 is an enlarged detail view of a portion of the operating mechanism for the emergency escape showing the operating mechanism in a released position.

FIGURE 8 is a cross-sectional view taken along the line 8—8 of FIGURE 7.

FIGURE 9 is a view similar to FIGURE 7 showing the the operating mechanism in an engaged position.

FIGURE 10 is a cross-sectional view taken along the line 10—10 of FIGURE 9.

In general, my emergency escape for a building consists of a frame which is mounted in a wall of the building. The frame is provided with lock rod receiving openings. A removable closure in the form of a hatch or door is mounted in the frame. The closure consists of a framework which has side walls which abut the frame. The side walls of the framework are provided with holes in alignment with the lock rod holes in the frame. A crank member is mounted for rotational movement within the framework. A plurality of lock rods extend through the openings in said framework and are connected to the crank so that the rods can be extended into the holes in the frame by rotation of the crank member in one direction and retracted from the holes in the frame by rotation of the crank member in an opposite direction. Spring means is provided for yieldably urging the lock rods out of engagement with the holes. Means is also provided for locking the crank member in a position so that the rods are normally maintained in engagement with the holes in the frame and means is provided for releasing the crank member from the locked position so that the spring means can move the lock rods out of locking engagement with the holes in the frame.

Figure 1:
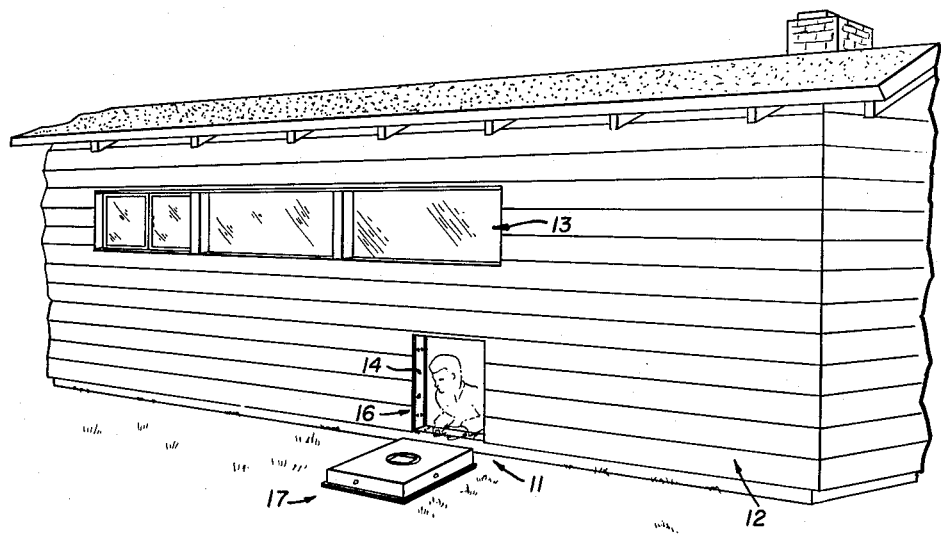
FIGURE 1 is a front elevational view of one embodiment of my emergency escape incorporated in a home.

More in particular, one embodiment of my emergency escape is shown in FIGURES 1–11 of the drawings. A typical installation of such an emergency escape is shown in FIGURE 1 in which the emergency escape 11 is mounted in one side wall 12 of a conventional wood frame dwelling. The emergency escape in this example has been mounted in a room which is provided with high windows 13 which would make it difficult, if not impossible, to escape from the room through the windows, and particularly so for small children, elderly persons and infirm individuals. In the installation shown, the emergency escape is mounted near the floor of the room to provide a ground level exit from the room, and providing, in addition, a point of egress most safe from the hazards of superheated air and toxic gases in case of fire.

The emergency escape 11 consists of a frame 14 which is mounted in the side wall 12 of the building to provide an escape or exit opening 16, which also may be called an escape hatchway or an escape doorway. The opening 16 is normally closed by a closure 17 which also may be called a hatch or a door.

The emergency escape is shown in detail in FIGURES 2–11. The frame 14 is normally rectangular in shape but it is apparent that, if desired, it can be of any suitable shape as, for example, round. The frame 14 and the closure 17 are formed of any suitable material such as aluminum, cadmium-plated steel, or galvanized steel. It is preferable that the frame and closure be formed of a suitable corrosion resistant material so that the emergency escape will always be easy to operate as hereinafter described. The frame 14, as shown, consists of side walls 21 and 22, and top and bottom walls 23 and 24. The opposite sides of each of the walls are provided with out-turned flanges 26.

Figure 2:
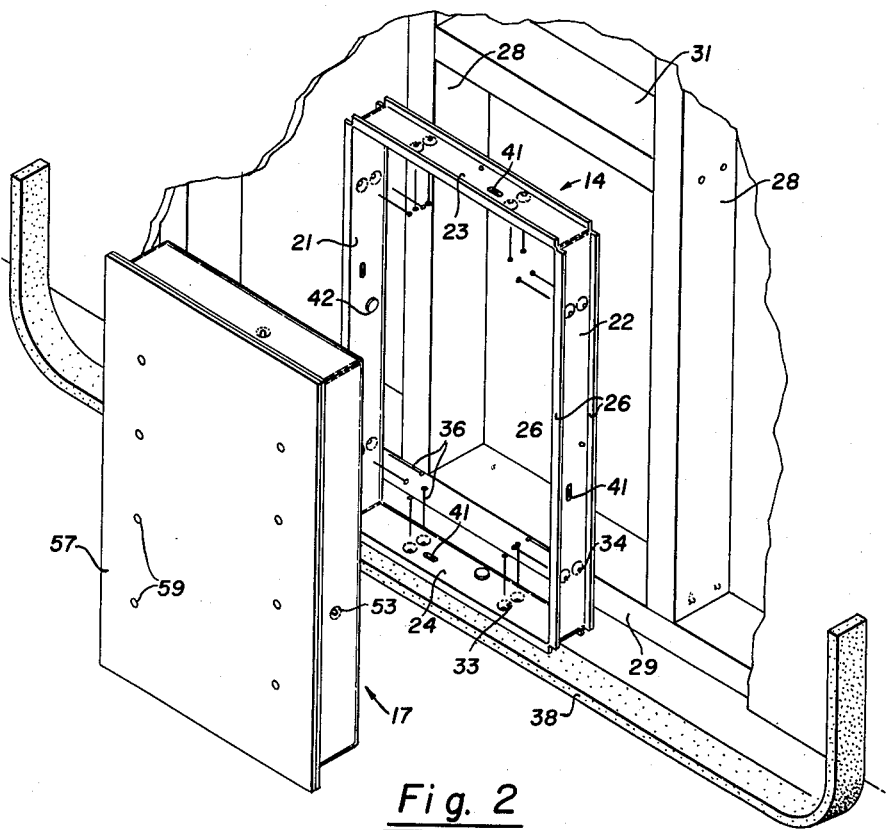
FIGURE 2 is an exploded view of the emergency escape shown in FIGURE 1.

As shown particularly in FIGURE 2, the frame 14 is constructed in such a manner that it can be readily mounted within the space provided between the standard 16-inch center-to-center stud spacing utilized in the walls of conventional wood-frame residential dwellings. In order to account for the slight deviations in stud spacing that are inherent in even the best of carpentry, the frame 14 is slightly narrower than the exact distance resulting from such 16-inch center-to-center spacing. A typical wall of a residential dwelling is shown in FIGURE 2 and consists of horizontally spaced vertical studs 28 which, in most frame dwellings, consist of 2 x 4's having their lower ends nailed to a sill or base 29. Such walls also include members 31, also 2 x 4's, which form fire blocks between the studs.

In new construction, the fire block 31 is positioned so that an opening will be provided between it and the sill 29 and by the studs 28 which will receive the frame 14. In existing construction, a fire block member 31 can be put in place between the stud members with very little difficulty to obtain the proper size opening. Each of the walls of the frame is provided with recesses 33 having centrally disposed holes 34 therein which are adapted to receive nails 36 for securing the frame 14 into the wood framework of the building. The slight difference between the width of frame 14 and the opposing faces of studs 28 is made up by shimming techniques well known to carpenters of the professional as well as of the week-end variety.

In order to prevent leakage of air between the frame 14 and the framework of the building, suitable insulation means in the form of a strip 38 of polyurethane foam or other low density, resilient, insulating material can be wrapped about the frame in the recesses provided between the out-turned flanges 26 and fastened in place by the nails 36 utilized for securing the frame 14 to the wood framework.

Figure 6:
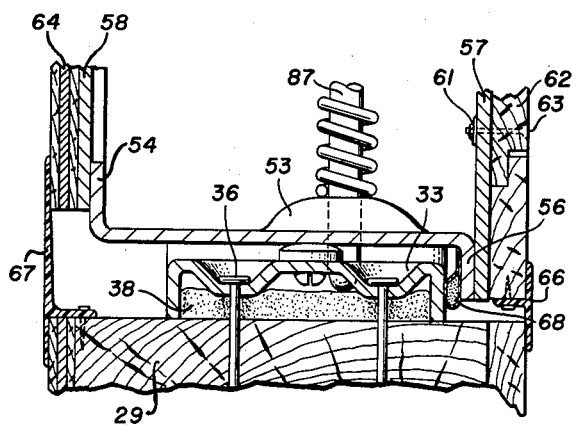
FIGURE 6 is a cross-sectional detail view of the portion of the emergency escape within the line 6—6 of FIGURE 4.
Figure 11:
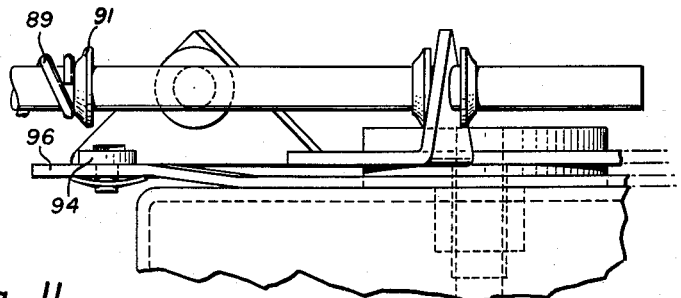
FIGURE 11 is an enlarged cross-sectional view taken along the line 11—11 of FIGURE 7.

It will be noted particularly from FIGURE 6 that the walls forming the frame 14 have a width which is substantially less than the width of studs forming the wood framework so that it can be positioned to accommodate the closure 17 to provide flush surfaces as hereinafter described.

Each of the walls forming the frame 14 is provided with a lock rod receiving hole 41 which is elongate in shape for a purpose hereinafter described. Bearing members 42 in the form of nylon buttons are mounted on the inner surface of each of the side walls for a purpose hereinafter described.

As hereinbefore described, the framework 14 provides an escape exit or opening 16 which is normally closed by the closure 17. The closure 17 consists of a framework 46 of the same general configuration as the frame 14 so that the closure 17 can fit within the frame 14. The framework 46 consists of side walls 47 and 48, and top and bottom walls 49 and 51 which correspond to the side walls 21 and 22, and the top and bottom walls 23 and 24 of the frame 14. The walls of the framework 46 are adapted to substantially abut the corresponding walls of the frame 14. The walls 47, 48, 49 and 51 are provided with holes 52 which are in general alignment with the holes 41 provided in the frame 14. As shown particularly in FIGURES 3, 4 and 5, the holes 52 are provided in recessed portions 53 of the walls.

The inner side edges of the walls forming the framework 46 are provided with in-turned flanges 54, whereas the outer side edges of the same walls are provided with out-turned flanges 56. An outside cover plate 57 is secured to the flanges 56 by suitable means such as spot welding, and an inside cover plate 58 is secured to the in-turned flanges 54 also by suitable means such as spot welding.

Both the outside cover plate 57 and the inside cover plate 58 are provided with means to facilitate attachment of the conventional exterior and interior building materials utilized in the building in which the emergency escape is to be mounted. Thus, for example, the outside cover plate 57 is provided with a plurality of holes 59 which, as shown, can be spaced in vertical rows and behind which are mounted captive nuts 61 to facilitate the mounting of certain types of exterior finishing materials such as the "rustic" siding 62 shown in the drawing. The siding is secured to the outside cover plate 57 by countersunk screws 63 threaded into the captive nuts 61. The interior wall cover 64 can also be secured to the inside cover plate 58 by suitable means such as glue or other mastic compounds. For example, as shown in FIGURE 6, if decorative plywood is utilized for finishing the interior, the plywood can be secured to the inside cover plate 58 by a suitable adhesive.

Trimming material is also provided for the emergency escape and, as shown in the drawing, can consist of exterior T-shaped trim members 66 of suitable material such as plastic which are secured to the outer cover plate 57 by nailing the trim to the siding 62 carried by the outer cover plate. In the same manner, similar T-shaped trim members 67 also of suitable material such as plastic can be mounted on the frame members of the dwelling as shown in FIGURE 6 to cover the space between the inner surface of the closure 17 and the opening provided by the frame members of the dwelling.

To prevent air flow between the closure 17 and the frame 14, suitable weatherstripping material can be provided such as conventional weatherstrip 68. The weatherstrip 68 is secured to the inner surface of the flange 56 by suitable means such as by an adhesive so that a weather-tight seal is established between the frame 14 and the closure 17 as shown particularly in FIGURE 6.

Operative means is provided for locking the closure 17 in place in the frame 14 and for releasing the closure so that it can be pushed out of the frame 14 to permit an emergency escape as hereinafter described. The operative means consists of a crank member 71 which is affixed to a flanged hub 72. The hub 72 is affixed to an operating shaft 73 which extends into a cup-shaped member 74 affixed to and centrally located on the inside cover plate 58. The cup-shaped member 74 is generally cylindrical in shape and opens into an opening 76 provided in the inside cover plate 58. Bearing means is provided in the cup-shaped member 74 and consists of a flanged bushing 77 which is secured to the cup-shaped member 74. The shaft 73 is provided with a covering 78 which provides a bearing surface for rotational and rectilinear movement of the shaft as hereinafter described. One bearing surface found to be particularly suitable consists of heat shrinkable tubing in the form of irradiated polytetrafluoroethylene which is shrunk to a tight mechanical fit onto the shaft 73 by the application of heat. As is well known to those skilled in the art, polytetrafluoroethylene has a very low coefficient of friction, is highly inert, has consistent mechanical and chemical properties over a wide temperature range, requires no lubrication under intermittent operating conditions inherent in the concept of this invention and therefore, serves as an excellent bearing material for the covering 78. The employment of the above shaft covering should not be considered as the sole means of accomplishing the objective of this device. For example, the use of a molded or machined material such as "nylon" as the material for bushing 77 enables shaft 73 to be used without a covering 78.

An additional flanged member 79 is affixed to the other end of the shaft 73 and has mounted thereon an operating knob 81. The knob 81 can be of any desired shape but preferably is one which is provided with straight sides for a reason hereinafter described. A compression spring 82 is mounted axially on the shaft 73 between the flanged member 79 and the cup-shaped member 74 and serves to yieldably urge the shaft and the crank member 71 toward the inner cover plate 58 or towards the left as viewed in FIGURE 8 for a purpose hereinafter described.

The crank member 71 which also may be called a star wheel is provided with out-turned ears 84 which extend radially from the center of the crank member. The ears 84 are provided with openings 86 which lie in planes generally at right angles to the axis of rotation of the crank member 71. The holes or openings 86 are in general alignment with the holes 52 provided in the side walls of the framework 46. Lock rods 87 are mounted in the aligned holes 52 and 86. The holes 52 and 86 are so arranged that alternate lock rods lie in parallel planes and that adjacent lock rods lie in planes at substantially right angles with respect to each other. The lock rods are connected to the crank member 71 at the point substantially tangent with the crank member as shown particularly in FIGURE 7. The lock rods are secured to the crank member 71 by suitable means such as the "Pal Pushnuts" 88 shown in the drawing. As will be noted, the "Pal Pushnuts" are spaced apart so that the crank member 71 can rotate through a predetermined angle as hereinafter described.

Means is provided for yieldably urging the lock rods 87 out of engagement with the holes 41 provided in the frame 14 and consists of compression springs 89 mounted axially on each of the rods 87 and held in a predetermined position on the rods by suitable means such as "Pal Pushnuts" 91.

Means is provided for locking the crank member 71 and the lock rods carried thereby in a locked position, that is, with the rods 87 engaged in the holes 41 as shown in FIGURE 9. This means consists of a pair of buttons 94 of suitable material such as "nylon" which are mounted on opposite ends of an elongate member 96 secured to the cup-shaped member 74 (see FIGURE 11). When the operating mechanism is in the position shown in FIGURES 9 and 11, the compression spring 82 serves to urge the crank member 71 to the left so that the ears 84 of the crank member are urged past the faces of the buttons 94 and rest upon the edges of the buttons 94. The buttons seat within shallow detents 84a formed in the ears 84 of the crank member. The buttons serve as stops to prevent rotation of the crank member 71 by the springs 89 provided on the rods 87.

It is the purpose of the detents 84a to provide assurance that random vibration or occasional accidental striking of the closure 17 will not cause unlocking action to take place. The vector forces arising from the urging of lock rod springs 89 and of compression spring 82 cause the detents 84a in ears 84 of the crank member 71 and the edge of buttons 94 to remain in intimate contact when the mechanism is in the locked state. It may be seen, therefore, that to unlock the device it is necessary to overcome the force exerted by compression spring 82 and, in addition, overcome the urging of lock rod springs 89 for that distance that crank member ears 84 and buttons 94 must move relative to each other in order to allow the buttons 94 to emerge from the detents 84a to the flat surfaces of ears 84.

As hereinafter described, the crank member 71 can be released merely by pushing outwardly on the knob 81 against the compression spring 82 so that the detents 84a in ears 84 no longer engage the stop buttons 94 to thereby permit rotation of the crank member and movement of the lock rods 87 by the compressing springs 89 out of the openings 41.

Means is also provided for limiting the rotation of the crank member 71 beyond a predetermined angular position so that there is no binding or seizing during rotation of the same and so that lock rods 87 will not become disengaged from holes 52 in closure 17. It consists of an extension 87a on one of the lock rods 87. The extension 87a is of a suitable length so that it is adapted to engage one of the next adjacent rods to stop rotation of the crank member beyond a predetermined angular position as shown particularly in FIGURE 7.

Means is provided to both prevent and indicate tampering with the actuator knob 81 of the operating mechanism and consists of a flanged trim ring 101 of suitable material such as plastic. The trim ring 101 is provided with an annular groove 102 approximately midway between the outer and inner edges of the same which is adapted to seat a snap ring 103 of suitable material such as cardboard. The snap ring 103 is provided with a covering 104 of suitable transparent material such as "cellophane" which has perforations 106 extending across the same to facilitate tearing or breaking of the covering when it is desired to operate the actuator knob 81.

Operation and use of my emergency escape may now be briefly described as follows. Let it be assumed that the closure or hatch 17 has been mounted within the frame 14 as shown in FIGURES 3, 9 and 10, and that it is now desired to utilize the same for emergency escape from a building or dwelling because of a fire or other reason. The individual wishing to escape merely pushes outwardly on the actuator knob 81. The outward pushing on the actuator knob, corresponding to the normal action of an individual attempting to escape from a room, breaks the "cellophane" covering and overcomes the force provided by the compression spring 82 and lock rod springs 89 and pushes the crank member or star wheel 71 over the stop buttons 94 so that the ears 84 clear the stop buttons. As soon as the crank member 71 clears the stop buttons 94, the springs 89 cause counter-clockwise rotation of the crank member 71 as viewed in FIGURE 7 to move the lock rods 87 out of engagement with the holes 41 and into the recesses 53 provided in the framework of the closure. This disengagement of the lock rods 87 from the holes 41 occurs almost instantaneously after the actuator knob 81 has been depressed. Thus, at the same time that the individual is pressing against the actuator knob 81, the lock rods will become disengaged and the entire closure 17 can be pushed outwardly as shown in FIGURE 5 whereupon it will drop to the ground to permit the individual to readily escape through the opening provided in the outer or fixed frame 14. The opening is of such a size that the individual can readily crawl through the same and escape.

Now let it be assumed that the emergency which arose no longer exists and that it is desired to replace the closure 17 within the frame 14. An individual inside the building picks up the closure 17 by the operating knob 81 and pulls it up into the opening in the frame 14. As soon as the closure 17 has been pulled completely into the opening in the frame 14 so that the flange 56 engages the frame 14, the knob 81 is rotated to the left as viewed in FIGURE 3 against the force of the springs 89 to urge the lock rods 87 into engagement with the holes 41 provided in the frame 14. As soon as the crank member 71 has been rotated sufficiently, the compression spring 82 provided on the shaft 73 will urge the crank member 71 over the stop buttons 94, thus causing the shallow detents 84a in the ears 84 and the edges of the stop buttons 94 to become engaged to again lock the crank member and the lock rods in the locked position hereinbefore described. A new snap ring 103 can be placed in the hole 76.

The use of the cellophane covered snap ring 103 is advantageous in that it is easy to ascertain whether or not there has been unauthorized use of or tampering with the emergency escape as, for example, by children. The shape of the knob 81 makes it possible to ascertain from a distance whether or not the operating mechanism for the emergency escape is in a locked or engaged position or in an unlocked or disengaged position. The knob is positioned in such a manner that when the side edges of the knob are substantially vertical and horizontal, the operating mechanism is in a locked position. When it is released or in an unlocked position, the side edges of the knob are inclined at an angle with respect to horizontal and vertical lines as indicated in the dot and dash lines shown in FIGURE 3, to readily indicate that the operating mechanism is in the unlatched or unlocked position.

The bearing members 42 provided on the frame member 14 furnish a low coefficient-of-friction contact with closure 17 and thus ensure that no seizure will occur between the closure 17 and the frame 14 so that the closure 17 can always be readily pushed out of the frame 14. In addition, the bearing members 42 serve to create a "step effect" between frame walls 21, 22, 23, 24 and closure walls 47, 48, 49, 51 respectively. That is, upon the emergency of closure 17 beyond the point where said closure rests upon, or is constrained by, bearing members 42, the clearance between adjacent frame and closure walls is increased on each side by a distance equal to the projection of the bearing member 42 beyond the surface of frame walls 21, 22, 23 and 24. This feature assures positive ejection of closure 17 during the final instants of operation of this emergency escape. The bearing members are centrally disposed on the walls forming the frame 14 and, therefore, prevent corner-binding of the closure 17 within the frame. Such binding might occur if the bearing members were not present as, for example, if the building in which the emergency escape is mounted should settle to cause tilting of the frame members of the building.

The hole 41 provided in the frame 14 are elongate to accommodate any warping which may occur in the frame of the building so that no binding of the lock rods can occur to prevent operation of the operating mechanism. In fact, the entire operating mechanism has been arranged in such a manner that no binding can occur. It is for this reason that a very loose connection is provided between the crank member 71 and the lock rods.

If desired, operating instructions can be placed on the exterior surface of the actuator knob 81 as by means of a decal or other suitable means.

Although I have particularly described the emergency escape shown in FIGURES 1-11 as being adapted for use in homes, it is readily apparent that it can be utilized in apartments and other types of residential dwellings as well as commercial and industrial establishments. The construction of the emergency escape is such that it can be incorporated in already existing construction as well as new construction. It is made in such a manner that it can be installed by relatively unskilled labor as, for example, it can be installed by the homeowner himself. It can be installed in existing conventional wood frame dwellings as hereinbefore described without the attendant disadvantages inherent in any device requiring structural alteration as a prerequisite to installation. The construction is such that exterior and interior surfaces of the emergency escape will be flush with the interior and exterior surfaces of the building and, therefore, will not detract from the appearance of the room or the exterior of the building.

It is apparent, upon examining FIGURES 1-11, that the emergency escape shown therein may be made operable from both sides. This is accomplished within the scope of this invention by extending shaft 73, to which another section of covering 78 has been shrunk, beyond star wheel or crank member 71 into another flanged bushing mounted on the inside surface of cover plate 57 and allowing the shaft to protrude through a clearance hole in cover plate 57 to beyond the outer surface of the plate. By affixing another flanged hub and knob to the protruding shaft 73 operation from either side of closure 17 is afforded. The provision of another cup-shaped member similar to member 74 affixed to and centrally located on cover plate 57, and on which flanged bushing is mounted, provides a suitable recess for the second knob.

From the foregoing it is also apparent that with means for operating closure 17 from the outside or the side of cover plate 57 or in other words the side of out-turned flanges 56 of frame 46, it is then possible, by appropriate orientation of frame 14 during installation, to provide an escape means wherein closure 17 is operated by pulling the second knob in a direction away from cup-shaped member in which it is mounted. When the above is done from the cover plate 57 facing to the inside of the room or enclosed area, the closure 17 will be released to the inside of the enclosed area or room. By mounting of closure 17 and frame 14 in this manner, it is possible to operate the closure from either side.

If it is desired to eliminate the frame 14, stand-off blocks of wood or plastic affixed to the building, can be provided with properly oriented lock-rod-receiving-holes therein. The closure 17 will then still operate in the same manner.

Figure 12:
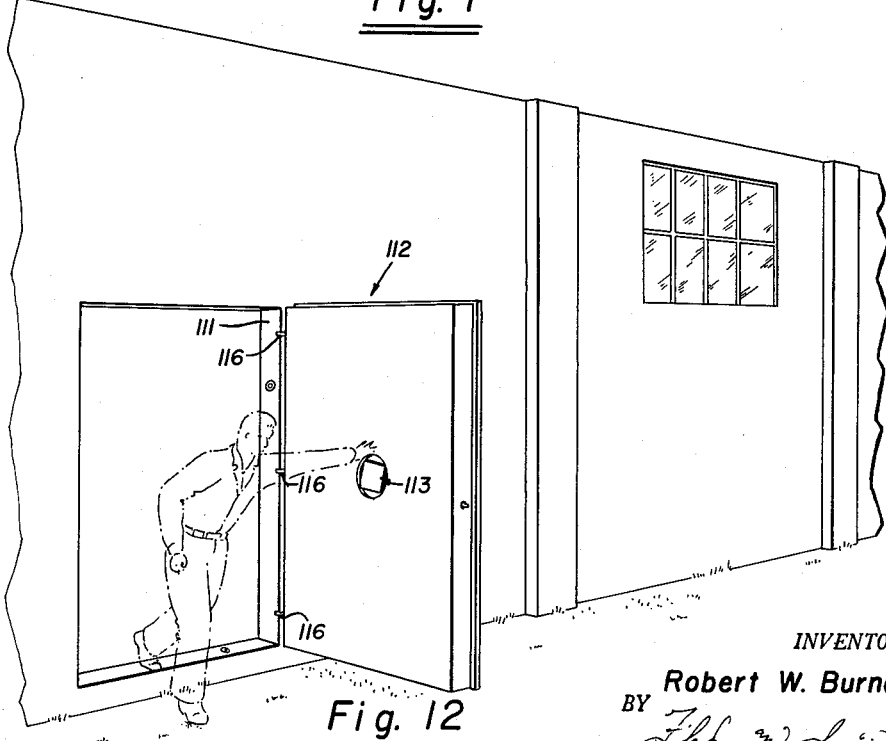
FIGURE 12 is a side elevational view of an industrial building incorporating another embodiment of my emergency escape.
Figure 13:
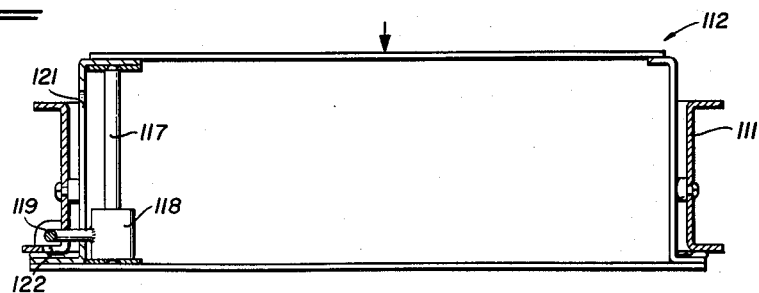
FIGURE 13 is a cross-sectional view of the emergency escape in FIGURE 12 showing the construction of the hinge means.
Figure 14:
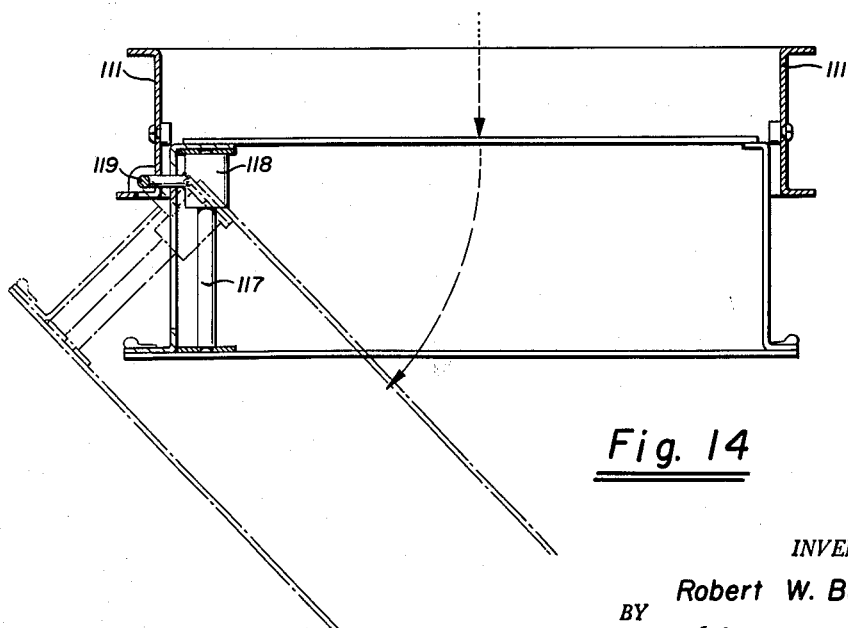
FIGURE 14 is a view similar to FIGURE 13 but showing the operation of the hinge means as the emergency escape door is opened.

Another embodiment of my emergency escape is shown in FIGURES 12-14 and is of a type which is particularly adaptable for use in commercial or industrial structures. It has a construction which is particularly adapted for use in providing an escape through a larger opening as, for example, an opening through which a man can walk rather than crawl or through an opening in a wall having great thickness. This embodiment consists of a fixed frame 111 of a construction similar to frame 14. It is mounted in the wall of the building in a suitable manner. The closure 112, although much larger, is similar to the closure 17 and is provided with a similar operating mechanism 113. With such a large closure or door 112, it is desirable to provide some means for carrying the door when the door is pushed out of the fixed frame 111. To this end I have provided hinge means 116 at the top, intermediate and bottom portions of the door 112. This hinge means 116 consists of a rod 117 which is mounted within the framework of the door adjacent and parallel to one side edge of the same and extending between the inner and outer covers of the door at right angles thereto. A linear bearing 118 is slidably mounted on the rod 117 and carries an L-shaped pintle 119 which extends through a horizontal elongate slot 121 in the adjacent side wall of the door and through a slot 122 provided in the side wall of the fixed frame 111. The slot 121 extends substantially the entire width of the side wall of the door, whereas the slot 122 is relatively short and is disposed adjacent the outer edge of the frame 111.

Operation and use of this hinge means is apparent from FIGURE 14. The door is first released by operating the operating mechanism 113 in a manner similar to that described for the previous embodiment. The operating mechanism releases almost instantaneously and the door can be pushed outwardly as shown in FIGURE 14. The bearing member 118 first slides on the rod 117 and carries with it the pintle 119 which rides in the slot 121 provided in the door. As soon as the door has been moved to a substantially open position, it can be swung outwardly out of the opening by rotation of the pintle 119 in the slot 122 to provide an opening through which escape may be easily made. The door will be supported in an upright position as shown particularly in FIGURE 12 and will not fall out of the opening when it is unlocked or released.

The door 112 can be readily closed by pulling it inwardly by the actuator knob 81. It is first swung to a closed position and is then pulled inwardly so that the bearing 118 can slide back to its original position as shown in FIGURE 13. The operating mechanism 113 can then be operated to lock the door in the closed position.

The emergency escape shown in FIGURES 12–14 is particularly adapted for use in large industrial, commercial, institutional and military buildings where it is normally not desirable to provide any more openings than is absolutely necessary. For example, in many industrial plants, there is a great need for "clean" rooms for the assembly of certain types of products. In such rooms, it is undesirable to provide a plurality of exits. This is also the case in powder rooms, filling rooms and other types of rooms. The emergency escape shown in FIGURES 12–14 particularly lends itself to this type of use.

It is apparent from the foregoing that I have provided an emergency escape which is particularly adapted for use in residential dwellings, commercial, industrial, institutional and military buildings. The construction is such that it is relatively easy and economical to manufacture. It can be prefabricated and then installed in a building during construction or after it has been constructed. The operating mechanism is such that it can be readily operated. Its construction is such that it does not detract from the appearance of the building in which it is mounted.

It is also to be noted that the emergency escape hereinbefore detailed has utility not only in building walls, but in like manner, in ceilings, floors, and roofs of residential, commercial, industrial, institutional and military buildings.

I claim:

1. In an emergency escape for a building, a frame mounted in the wall of the building and having latch-rod receiving openings therein, the frame having side walls forming an escape opening, a closure mounted in the opening in the frame and having side walls adapted to abut the side walls of the frame, the side walls of the closure being formed with openings in substantial alignment with the latch-rod openings in the frame, a crank member, means mounting the crank member for rotational movement within the closure and for movement in a direction perpendicular to the plane of rotation of the crank member, a plurality of latch-rods extending through the openings in said closure and being connected to said crank member so that said rods can be extended into the latch-rod receiving openings in the frame by rotation of the crank member in one direction and retracted from the latch-rod receiving openings in the frame by rotation of the crank member in an opposite direction, spring means yieldably urging said rods out of engagement with the latch-rod receiving openings in the frame, means for locking said crank member and latch rods in a position so that the latch rods are seated in the latch-rod receiving openings in the frame and means for releasing said crank member and the latch rods carried thereby so that said spring means can automatically move said latch rods out of engagement with the latch-rod receiving openings in the frame, the means for locking said crank member including an abutment member adapted to be engaged by the crank member and spring means for yieldably urging the crank member into engagement with the abutment member.

2. An emergency escape as in claim 1 wherein said latch rods are disposed at substantially right angles to each other and wherein one of the latch rods is adapted to engage the other latch rod to prevent rotation of the crank member beyond a predetermined angular position by urging of said spring means.

3. An emergency escape as in claim 1 wherein said means for releasing the crank member from its locked position consists of manually operated means for overcoming the force of the spring means and to move said crank member in a direction away from said abutment member.

4. An emergency escape as in claim 1 wherein the frame is mounted between adjacent vertical stud members having a conventional spacing in the building.

5. An emergency escape as in claim 1 together with hinge means for supporting said closure as said closure is moved out of said opening in the frame.

6. In an emergency escape for a building, a frame mounted in a side wall of the building, the frame having side walls forming an escape opening through which a human body can pass, the side walls of the frame having latch-rod receiving holes therein, a closure for said opening in said frame, said closure having side walls adapted to abut the side walls of the frame, the side walls of the closure being provided with holes in substantial alignment with the holes in the side walls of the frame, a crank member, means mounting said crank member for rotational movement in said closure, a plurality of latch rods extending through the holes in the side walls of the closure and being connected to said crank member, said latch rods being adapted to be extended into the holes in the side walls of the frame by rotation of the crank member in one direction and retracted from the holes in the side walls of the frame by rotation of the crank member in an opposite direction, spring means mounted on said latch rods for yieldably urging said latch rods out of engagement with the holes in the side walls of said frame, said means for rotatably mounting said crank member permitting movement of said crank member in a direction perpendicular to the plane of rotation of the crank member, abutment means mounted in said closure, means formed on said crank member and adapted to engage said abutment means, means yieldably urging said crank member in a direction towards said abutment means so that as said crank member is rotated beyond a predetermined angular position it will be urged into engagement with the abutment means to lock said crank member in said predetermined angular position, and an operating handle connected to said crank member for overcoming the force of the yieldable means urging the crank member into engagement with the abutment means so that the crank member can be unlocked to thereby permit the spring means mounted on the latch rods to move the latch rods out of engagement with the holes in the side walls of the frame and to permit the closure to be removed from said opening.

7. An emergency escape as in claim 6 wherein said latch rods are disposed at substantially right angles with respect to each other and lie substantially in the same plane and wherein one of the latch rods is provided with an extension which is adapted to engage another of the latch rods to prevent rotation of the crank member beyond a predetermined angular position by the urging of said spring means.

8. An emergency escape as in claim 6 together with hinge means for supporting said closure as the closure is moved out of the opening in the frame, said hinge means comprising a rod mounted within the closure parallel and adjacent to one of the side walls of the closure, a linear bearing slidably mounted on said rod, the side wall adjacent the rod being provided with an elongate slot, and a pintle mounted on said linear bearing and extending through the slot in the side wall of the closure, the adjacent side wall of the frame being provided with a slot in substantial alignment with the slot in the side wall of the closure, the pintle extending through the slot in the side wall of the frame.

9. An emergency escape as in claim 6 wherein said building is of the conventional frame type with side walls including vertical studs having a substantially 16-inch center-to-center spacing, and wherein the frame is of such a size that it is adapted to be mounted between said vertical studs.

10. An emergency escape as in claim 9 wherein the side walls of the frame have a width which is substantially less than the width of the vertical studs.

11. An emergency escape as in claim 10 together with insulating means disposed between the exterior of the frame and the vertical studs.

12. An emergency escape as in claim 9 wherein the exterior and interior surfaces of the closure are substantially flush with the exterior and interior surfaces of the side wall in which the emergency escape is mounted.

13. An emergency escape as in claim 12 wherein the closure is provided with interior and exterior cover plates and wherein one of the cover plates is provided with a recess in which the operating handle is mounted.

14. An emergency escape as in claim 13 together with trim mounted between the closure and the side wall of the building.

References Cited in the file of this patent

UNITED STATES PATENTS

| | | |
|---|---|---|
| 2,033,438 | McFerran | Mar. 10, 1936 |
| 2,297,056 | Gunnison | Sept. 29, 1942 |
| 2,594,253 | Vander Veer | Apr. 22, 1952 |